Sept. 16, 1958        K. A. LARKIN        2,851,868

SHAFT COUPLING DEVICE

Filed April 16, 1956

INVENTOR.
KENNETH A. LARKIN,
BY
Perry E. Turner
AGENT.

United States Patent Office 2,851,868
Patented Sept. 16, 1958

2,851,868

SHAFT COUPLING DEVICE

Kenneth A. Larkin, Los Angeles, Calif., assignor to Lear, Incorporated, Santa Monica, Calif.

Application April 16, 1956, Serial No. 578,299

5 Claims. (Cl. 64—31)

This invention relates to shaft couplings, and more particularly to a device to simplify assembly of shaft couplings and to permit unitary rotation of a pair of misaligned shafts.

In many installations, a driving shaft and a driven shaft are mounted with their axes of rotation substantially aligned, and a coupling element is inserted between the adjacent ends of the shafts to permit their unitary rotation, such element being slidably engaged by appropriate mating elements or portions at the ends of the shafts so as to move transversely to the axes thereof during rotation and thereby avoid mechanical locking or binding of the shafts. In assembly, the driven shaft is mounted with one end journaled in a rigid support; the coupling element is placed in its proper position between the mating portions of the adjacent ends of the driving and driven shaft, and a thrust is maintained on the driving shaft to hold the coupling element in place until the driving shaft is also properly mounted. The thrust is usually applied manually, and pains must be taken to maintain the thrust throughout the assembling operations to prevent the coupling element from being dislodged from its proper position. The same difficulties are encountered upon reassembly of the shafts and coupling element after these parts have been disconnected for servicing apparatus connected to the shafts.

It is an object of this invention to provide simple coupling means to permit assembly of flexible couplings with a minimum of painstaking manual operations.

It is another object of this invention to provide coupling means which will permit driving and driven shafts to be assembled without the necessity of journaling the driven shaft in a rigid support for preventing axial movement thereof.

It is another object of this invention to provide shaft coupling means with which a pair of shafts can be assembled at a rapid rate, either initially or after servicing associated apparatus, which comprises a minimum of component parts of simple design, and which requires no lubrication or maintenance.

Figure 4:
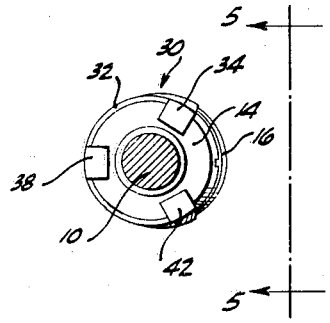
Figure 5:
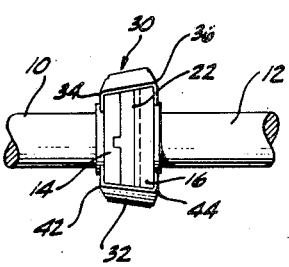

The above and other objects and advantages of this invention will be apparent from the following description, taken in conjunction with the accompanying drawings, in which a preferred embodiment of the invention is illustrated by way of example. The scope of the invention is pointed out in the appended claims. In the drawing, Fig. 1 is an exploded perspective view of means for coupling a pair of shafts, in accordance with this invention, Fig. 2 is an end elevation view of the assembled coupling means of Fig. 1, Fig. 3 is a side elevation view taken along line 3—3 of Fig. 2, and Figs. 4 and 5 are respective elevation views, similar to Figs. 2 and 3, to illustrate the utility of the shaft coupling means of Fig. 1 in assembly with axially displaced shafts.

Briefly, this invention comprises a pair of hub elements fixed to the adjacent ends of a driving and driven shaft, between which a coupling element is located, and a flexible clip element having a rim portion from which a number of short radial flanges extend. The hub elements and coupling element are captured between the flanges, and spring action of the clip element maintains the parts in desired relation and eliminates the need for manual effort to apply thrust for this purpose in assembling the shafts. It prevents axial movement of the shafts such as would cause the parts to be disengaged, thereby obviating the necessity for journaling the driven shaft in a rigid support, and it provides protection against end play of the shafts.

Figure 1:
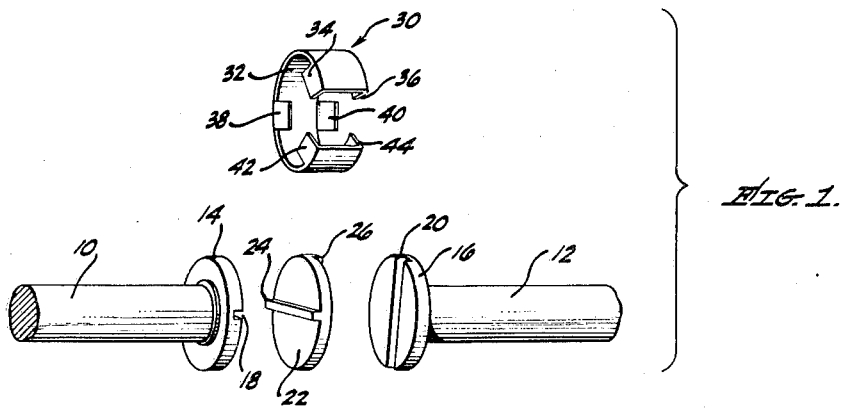
Figure 2:
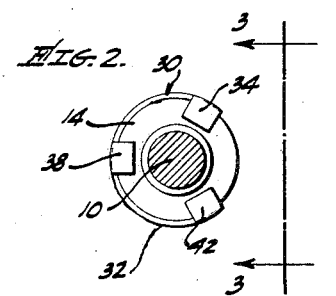
Figure 3:
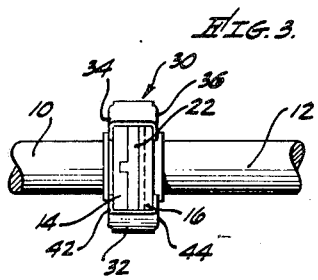

Referring to Figs. 1–3, a pair of shafts 10 and 12 have respective hubs 14, 16 fixed to their adjacent ends. Hubs 14, 16 are provided with respective notches or slots 18 and 20 in the centers of their confronting surfaces, which extend transversely to their axes. A disc type coupling element 22 is provided with smooth projections 24, 26 on opposite surfaces of the disc for mating with slots 18, 20. Projections 24, 26 extend across the center of the coupling element and transversely to its axis; further, the projections are at right angles to each other. Such a coupling element may be formed by machining the opposite surfaces of a disc to form the desired projections. In assembly, the coupling element is located between the hubs by positioning it with one projection, such as projection 26, in slot 20, and shaft 10 is turned to align slot 18 with the other projection 24, whereupon shaft 10 can be moved axially to locate projection 24 in slot 18 and effect registry of the adjacent surface areas of the hubs and coupling element.

A clip element 30 of flexible spring material, such as spring steel or Phosphor bronze, has a curved web portion 32 which is substantially equal to the combined widths of the lateral peripheral surfaces of hubs 14, 16 and the center disc portion of coupling element 22. Three spaced pairs of flanges 34—36, 38—40, 42—44 extend a short distance inwardly or radially from the edges of web 32. The web is of a length substantially greater than half such circumference. This construction permits clip 30 to be placed over the lateral peripheral surfaces of the hubs and coupling element whereby web 32 rims these parts and the pairs of flanges engages the outer or remote surfaces of hubs 14, 16 adjacent their peripheries. Thus positioned, the spring action of web 32 prevents axial movement of shafts 10, 12 such as would cause coupling element to be disengaged therefrom, and spring action of the flanges keeps the hubs 14, 16 urged toward each other, thereby to avoid axial movement of the shafts such as would effect disassembly of the coupling element.

A spring clip of the simple construction above described can be clipped to the hubs 14, 16 and coupling element 22 with ease. After the clip is in place, no manual effort is needed to exert thrust to hold the parts together during assembly; the clip performs this function. By virtue of the spring action above mentioned, there is no need to apply thrust to hold the coupling element in place during assembly. Furthermore, clip 30 can be left on after assembly to retain the parts of the coupling in proper relation during operation, whereby the driven shaft need not be journaled at its opposite end in a rigid support to insure this result; thus, a driven shaft need only be mounted in suitable bearings along its length to insure smooth rotation, and the holding action of clip 30 suffices to prevent axial play of the shaft. The clip can also be easily removed to permit the shafts to be axially separated and the coupling element removed, thus facilitating disassembly so apparatus coupled to either shaft can be serviced; after servicing, the coupling means can be reassembled as above described.

Figs. 4 and 5 illustrate the utility of the coupling means of this invention where the shafts 10, 12 are eccentrically or axially displaced a small amount. It will be recognized that this is the usual condition, inasmuch as perfect axial alignment cannot be assured in any production assembly. In this situation, web 32 flexes as indicated to extend across the axially displaced hubs and still permit the flanges to grip the outer surfaces thereof. It will be apparent that clip 30 will not interfere with the necessary floating action of coupling element 22. The coupling element turns with the shafts and, in the usual manner, undergoes transverse movement by virtue of slippage of the projections 24, 26 in slots 18, 20, to prevent mechanical locking or binding of the shafts. This movement is limited to a distance not greater than the axial displacement, so that movement of coupling element 22 is not impeded by web 32.

The coupling means of this invention can be arranged so that the hubs 14, 16, coupling element 22 and clip 30 can occupy no greater cross-sectional area than one of the shafts. For example, the illustrated portions of shafts 10, 12 may be projection ends of reduced diameter which extend from the main shaft bodies of the same diameter as the hubs 14, 16. In situations where the shafts with the coupling assembly must be inserted or withdrawn through an opening which provides little room for clearance, the coupling arrangement will be able to clear the opening.

It will be recognized that modifications of the coupling means herein described may be made without departing from the scope of this invention. For example, the flanges could be flared at their ends to facilitate locating or removing the clip. If desired, the flanges could be staggered; also, the flanges could be of different sizes and shapes. Furthermore, so long as the web portion of the clip element is wide enough to span the hubs and coupling element to permit the hubs to be captured between the flanges, the peripheral shape of the coupling element can be made as desired.

What is claimed is:

1. In combination with coupling means of the type employing a pair of hub members fixed to the adjacent ends of a pair of rotatable members having substantially aligned axes of rotation, and wherein a coupling member is positioned between the hub members and coactable therewith to permit unitary rotation of the rotatable members without binding, a clip retainer element comprising a curved web portion, the width of said web portion being substantially equal to the combined widths of the hub members and coupling member, the length of said web portion being substantially greater than half the circumference of a hub member, a plurality of radial flanges extending inwardly from the opposite edges of said web portion, whereby said web portion can be placed around the hub members to permit said flanges to embrace the hub members and coupling member between them, and said web portion and flanges being formed of spring material, said web portion providing spring action to restrain undesirable lateral movement of the hub members, and said flanges providing spring action to urge the hub members toward each other and thereby prevent axial movement of the hub members away from the coupling member.

2. The clip retainer element defined in claim 1, wherein said web portion and flanges are formed from a single piece of material.

3. Means for coupling a pair of rotatable shafts having substantially aligned axes of rotation comprising first and second hub members, said hub members respectively being secured to the adjacent ends of the shafts, the adjacent surfaces of said hub members being provided with diametral grooves, a coupling element disposed between said hub members and having portions mating with said grooves, and a flexible one-piece clip element including a curved web portion, the width of said web portion being at least equal to the combined widths of the hub members and coupling element, the length of said web portion being substantially less than the circumference of said hub members but substantially greater than half such circumference, a plurality of spaced resilient flanges extending substantially radially from the opposite edges of said web portion, and said clip element being located with said web portion spanning said hub members and coupling element to locate them between said flanges, and said flanges engaging said hub members to urge them toward each other and prevent axial movement of the shafts.

4. In combination with a pair of shafts having substantially aligned axes of rotation, first and second diametrally slotted hub members respectively secured to the adjacent ends of the shafts, and a coupling element interposed between the hub members having a center disc portion and a diametral projection on each of the surfaces of the disc portion for mating engagement with the slots in the hub members, a clip element of spring material comprising a web portion of a width to span the hub members and coupling element, said web portion being of a length substantially greater than the circumferential dimension of a hub member, a plurality of spaced flanges of leaf spring material extending from opposite edges of said web portion to capture the hub members therebetween, said web portion being adapted to fit around the hub members and restrain them against relative lateral movement while permitting slight transverse movement of the coupling element, and said flanges serving to exert an axial thrust to urge said hub members toward each other and against the coupling element, thereby to prevent axial movement of said shafts and to maintain the hub members in juxtaposition with the coupling element.

5. The combination defined in claim 4, wherein said web portion and flanges constitute a one-piece clip element formed from a single piece of spring material.

References Cited in the file of this patent

UNITED STATES PATENTS

| 2,335,170 | Cerisano | Nov. 23, 1943 |
| 2,388,450 | Thompson | Nov. 6, 1945 |

FOREIGN PATENTS

| 551,900 | Germany | Apr. 28, 1929 |